(12) United States Patent
Meyer et al.

(10) Patent No.: US 9,828,462 B2
(45) Date of Patent: Nov. 28, 2017

(54) PREPARATION OF SILOXANE-CONTAINING BLOCK COPOLYCARBONATES BY MEANS OF REACTIVE EXTRUSION

(71) Applicant: Covestro Deutschland AG, Leverkusen (DE)

(72) Inventors: Alexander Meyer, Düsseldorf (DE); Klaus Horn, Dormagen (DE); Reiner Rudolf, Langenfeld (DE); Ulrich Liesenfelder, Bergisch Gladbach (DE); Thomas König, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/027,750

(22) PCT Filed: Oct. 6, 2014

(86) PCT No.: PCT/EP2014/071293
§ 371 (c)(1),
(2) Date: Apr. 7, 2016

(87) PCT Pub. No.: WO2015/052110
PCT Pub. Date: Apr. 16, 2015

(65) Prior Publication Data
US 2016/0244559 A1    Aug. 25, 2016

(30) Foreign Application Priority Data
Oct. 8, 2013  (EP) ..................................... 13187752

(51) Int. Cl.
*C08G 64/18* (2006.01)
*C08G 77/448* (2006.01)

(52) U.S. Cl.
CPC .......... *C08G 64/186* (2013.01); *C08G 77/448* (2013.01)

(58) Field of Classification Search
CPC ............................ C08G 64/186; C08G 77/448
See application file for complete search history.

(56) References Cited

U.S. PATENT DOCUMENTS

| | | |
|---|---|---|
| 3,189,662 A | 6/1965 | Vaughn, Jr. |
| 3,419,634 A | 12/1968 | Vaughn, Jr. |
| 4,584,360 A | 4/1986 | Paul et al. |
| 4,707,393 A | 11/1987 | Vetter |
| 4,950,081 A | 8/1990 | List |
| 4,982,014 A | 1/1991 | Freitag et al. |
| 5,104,723 A | 4/1992 | Freitag et al. |
| 5,227,449 A | 7/1993 | Odell et al. |
| 5,288,778 A | 2/1994 | Schmitter et al. |
| 5,334,358 A | 8/1994 | Schuchardt et al. |
| 5,344,908 A | 9/1994 | Rosenquist |
| 5,399,012 A | 3/1995 | Schuchardt et al. |
| 5,407,266 A | 4/1995 | Dötsch et al. |
| 5,414,054 A | 5/1995 | Jonsson et al. |
| 5,504,177 A | 4/1996 | King, Jr. et al. |
| 5,505,536 A | 4/1996 | Schuchardt |
| 5,519,106 A * | 5/1996 | Nukui ................... C08G 64/307 264/176.1 |
| 5,658,075 A | 8/1997 | Schebesta et al. |
| 5,669,710 A | 9/1997 | Schebesta et al. |
| 5,783,651 A | 7/1998 | König et al. |
| 5,821,321 A | 10/1998 | Archey et al. |
| 5,821,380 A | 10/1998 | Holderbaum et al. |
| 5,846,659 A | 12/1998 | Löwer et al. |
| 5,876,115 A | 3/1999 | Schebesta et al. |
| 5,883,165 A | 3/1999 | Kröhnke et al. |
| 6,066,700 A | 5/2000 | König et al. |
| 8,044,122 B2 | 10/2011 | Ruediger et al. |
| 8,158,745 B2 | 4/2012 | Wehrmann et al. |
| 2005/0024987 A1 | 2/2005 | Kunz et al. |

FOREIGN PATENT DOCUMENTS

| | | |
|---|---|---|
| DE | 3334782 A1 | 10/1984 |
| DE | 3832396 A1 | 2/1990 |
| DE | 38 33 953 A1 | 4/1990 |
| DE | 19710081 A1 | 9/1998 |
| DE | 10311063 A1 | 9/2004 |
| DE | 102007011069 A1 | 9/2008 |
| DE | 102008019503 A1 | 10/2009 |
| EP | 0 110 238 A2 | 6/1984 |
| EP | 0110221 A2 | 6/1984 |
| EP | 122 535 A2 | 10/1984 |
| EP | 222 599 A2 | 5/1987 |
| EP | 329 092 A1 | 8/1989 |
| EP | 460 466 A1 | 12/1991 |
| EP | 0 500 496 A1 | 8/1992 |
| EP | 517 068 A1 | 12/1992 |
| EP | 528 210 A1 | 2/1993 |
| EP | 638 354 A1 | 2/1995 |
| EP | 0 716 919 A2 | 6/1996 |
| EP | 715 881 A2 | 6/1996 |
| EP | 715 882 A2 | 6/1996 |
| EP | 770636 A2 | 5/1997 |
| EP | 798 093 A2 | 10/1997 |
| EP | 0839623 A1 | 5/1998 |
| EP | 1308084 A1 | 5/2003 |
| FR | 1561518 A | 3/1969 |
| GB | 1229482 A | 4/1971 |
| WO | WO-96/15102 A2 | 5/1996 |
| WO | WO-03035235 A1 | 5/2003 |
| WO | WO-2013066002 A1 | 5/2013 |

OTHER PUBLICATIONS

International Search Report for PCT/EP2014/071293 dated Feb. 10, 2015.

* cited by examiner

*Primary Examiner* — David Buttner
(74) *Attorney, Agent, or Firm* — Drinker Biddle & Reath LLP

(57) ABSTRACT

The present invention relates to a process for preparing polysiloxane-polycarbonate block cocondensates proceeding from specific polycarbonates and hydroxyaryl-terminated polysiloxanes. More particularly, the present invention relates to the preparation of the said block cocondensates by means of a reactive extrusion.

14 Claims, 2 Drawing Sheets

PREPARATION OF SILOXANE-CONTAINING BLOCK COPOLYCARBONATES BY MEANS OF REACTIVE EXTRUSION

CROSS-REFERENCE TO RELATED APPLICATIONS

This application is a national stage application (under 35 U.S.C. §371) of PCT/EP2014/071293, filed Oct. 6, 2014, which claims benefit of European Application No. 13187752.4, filed Oct. 8, 2013, both of which are incorporated herein by reference in their entirety.

The present invention relates to a process for preparing polysiloxane-polycarbonate block cocondensates proceeding from specific polycarbonates and hydroxyaryl-terminated polysiloxanes. More particularly, the present invention relates to the preparation of the said block cocondensates by means of a reactive extrusion.

The invention further relates to the polysiloxane-polycarbonate block cocondensates which have been obtained by the process according to the invention, and to the use of these cocondensates in injection moulding and extrusion applications.

BACKGROUND OF THE INVENTION

It is known that polysiloxane-polycarbonate block cocondensates have good properties with regard to low-temperature impact strength or low-temperature notched impact strength, chemical resistance and outdoor weathering resistance, and to ageing properties and flame retardancy. In terms of these properties, they are in some cases superior to the conventional polycarbonates (homopolycarbonate based on bisphenol A).

The industrial preparation of these cocondensates proceeds from the monomers, usually via the interfacial process with phosgene. Also known is the preparation of these siloxane cocondensates via the melt transesterification process using diphenyl carbonate. However, these processes have the disadvantage that the industrial plants used therefor are used for preparation of standard polycarbonate and therefore have a high plant size. The preparation of specific block cocondensates in these plants is often economically unviable because of the smaller volume of these products. Moreover, the feedstocks required for preparation of the cocondensates, for example polydimethylsiloxanes, impair the plant, since they can lead to soiling of the plant or of the solvent circuits. In addition, toxic feedstocks such as phosgene are required for the preparation, or these processes entail a high energy demand.

The preparation of polysiloxane-polycarbonate block copolymers via the interfacial process is known from the literature and is described, for example, in U.S. Pat. Nos. 3,189,662, 3,419,634, DE-B 3 34 782 and EP 122 535.

The preparation of polysiloxane carbonate block copolymers by the melt transesterification process from bisphenol, diaryl carbonate and silanol end-terminated polysiloxanes in the presence of a catalyst is described in U.S. Pat. No. 5,227,449. The siloxane compounds used are polydiphenyl- or polydimethylsiloxane telomers with silanol end groups. It is known, however, that such dimethylsiloxanes having silanol end groups, in contrast to diphenylsiloxane with silanol end groups, have an increasing tendency to self-condensation with decreasing chain length in an acidic or basic medium, such that incorporation into the copolymer as it forms is made more difficult as a result. Cyclic siloxanes formed in this process remain in the polymer and have an exceptionally disruptive effect in applications in the electrical/electronics sector.

U.S. Pat. No. 5,504,177 describes the preparation of a block copolysiloxane carbonate via melt transesterification from a carbonate-terminated silicone with bisphenol and diaryl carbonate. Because of the great incompatibility of the siloxanes with bisphenol and diaryl carbonate, homogeneous incorporation of the siloxanes into the polycarbonate matrix can be achieved only with very great difficulty, if at all, via the melt transesterification process. Furthermore, the preparation of the block cocondensates proceeding from the monomers is very demanding.

EP 770636 describes a melt transesterification process for preparation of block copolysiloxane carbonates proceeding from bisphenol A and diaryl carbonate using specific catalysts. A drawback of this process is likewise the demanding synthesis of the copolymer proceeding from the monomers.

U.S. Pat. No. 5,344,908 describes the preparation of a silicone-polycarbonate block copolymer via a two-stage process in which an OH-terminated BPA oligocarbonate prepared via a melt transesterification process is reacted with a chlorine-terminated polyorganosiloxane in the presence of an organic solvent and of an acid scavenger. Such two-stage processes are likewise very demanding and can be performed only with difficulty in industrial scale plants.

Disadvantages of all these processes are the use of organic solvents in at least one step of the synthesis of the silicone-polycarbonate block copolymers, the use of phosgene as a feedstock and/or the inadequate quality of the cocondensate. More particularly, the synthesis of the cocondensates proceeding from the monomers is very demanding, both in the interfacial process and particularly in the melt transesterification process. For example, in the case of the melt process, a small relative underpressure and low temperatures have to be employed, in order to prevent vaporization and hence removal of the monomers. Only in later reaction stages in which oligomers with higher molar mass have formed can lower pressures and higher temperatures be employed. This means that the reaction has to be conducted over several stages and that the reaction times are accordingly long.

In order to avoid the above-described disadvantages, there are also known processes which proceed from commercial polycarbonates. This is described, for example, in U.S. Pat. Nos. 5,414,054 and 5,821,321. Here, a conventional polycarbonate is reacted with a specific polydimethylsiloxane in a reactive extrusion process. A disadvantage of these processes is the use of highly active transesterification catalysts which enable the preparation of the cocondensates within short residence times in an extruder. These transesterification catalysts remain in the product and can be inactivated only inadequately, if at all. Therefore, injection mouldings made from the cocondensates thus prepared have inadequate ageing characteristics, more particularly inadequate thermal ageing characteristics. Thus, the resulting block copolycarbonate is unsuitable for high-quality applications. Compared to a block copolycarbonate from the interfacial process, this product does not have the appropriate properties, such as ageing characteristics and mechanical properties.

DE 19710081 describes a process for preparing the cocondensates mentioned in a melt transesterification process proceeding from an oligocarbonate and a specific hydroxyarylsiloxane. However, the industrial scale preparation of oligocarbonates for preparation of relatively small-volume specific cocondensates is very costly and inconvenient. These oligocarbonates have relatively low molecular weights and relatively high OH end group concentrations. Frequently, these oligocarbonates, because of their short chain length, have phenolic OH concentrations above 1000 ppm. Such products are not normally commercially available and would therefore have to be produced specifically for the preparation of the cocondensates. However, it is uneconomic to operate industrial scale plants with the production of small-volume precursors. Moreover, such precursors, because of the impurities present in these products, for example residual solvents, residual catalysts, unreacted monomers etc., are much more reactive than high molecular weight commercial products based on polycarbonate. For these reasons, corresponding precursors or aromatic oligocarbonates suitable for the preparation of such block cocondensates are commercially unavailable. Moreover, the process described in DE 19710081 does not allow preparation of block cocondensate within short reaction times. Both the preparation of the oligocarbonate and the preparation of the block cocondensate are effected over several stages with residence times totalling well over one hour. Furthermore, the resulting material is unsuitable for the preparation of cocondensates, since the high concentration of OH end groups and other impurities, for example catalyst residue constituents, lead to a poor colour in the end product.

None of the abovementioned applications describes a process which proceeds from conventional polycarbonates commercially available in principle and affords polysiloxane-polycarbonate block cocondensates in high quality.

High quality in this context means that the cocondensates can be processed in injection moulding or by extrusion processes and have a relative solution viscosity of preferably at least 1.26, more preferably at least 1.27, especially preferably at least 1.28, determined in dichloromethane at a concentration of 5 g/l at 25° C. using a Ubbelohde viscosimeter. Furthermore, the corresponding products must have a high melt stability. In addition, the products should not have any discoloration such as browning or yellowing.

Commercially available polycarbonates have only low reactivity and, in contrast to the above-described oligocarbonates or polycarbonate precursors, are very melt-stable. In other words, they can be compounded under the customary processing conditions or can be processed in injection moulding or in extrusion without restriction and without any change in the properties. The person skilled in the art thus assumes that these polycarbonates, which may also contain stabilizers or quenchers, are unsuitable for preparation of copolymers because of their high stability.

BRIEF SUMMARY OF THE INVENTION

Proceeding from the prior art outlined, the problem addressed was therefore that of developing an inexpensive process for the preparation of the cocondensates mentioned, which does not require toxic feedstocks such as phosgene. A further objective was to avoid preparation of such cocondensates from the monomers, i.e. proceeding from the low molecular weight bisphenols and organic carbonates such as diphenyl carbonate, since this is very demanding and requires a costly standard polycarbonate synthesis or copolycarbonate synthesis in a corresponding industrial scale plant. Instead, the process according to the invention is to enable the preparation of the cocondensates proceeding from polycarbonates commercially available in principle. Such processes are, for example, transesterification processes described in principle in the literature—for example in U.S. Pat. No. 5,414,054. However, there is no known process which affords the cocondensates in comparable quality to that in the interfacial process. A further problem addressed was therefore that of developing a process which affords polysiloxane-polycarbonate block cocondenates in high quality, such that the materials are suitable for injection moulding and extrusion applications. Furthermore, the process is to afford the block copolymer within a short reaction time. Typically, the formation of polycarbonates by the melt transesterification process proceeds in several stages with high residence times (for example greater than one hour until the respective target viscosity has been attained). In contrast, the block copolymer is to be prepared in the appropriate target viscosity within short reaction times.

Moreover, inexpensively preparable siloxane components are to be used for preparation of block cocondensates. Frequently, several reaction stages, some under platinum or ruthenium catalysis, are needed for preparation of the siloxane blocks. This considerably increases the costs of preparation of these siloxane blocks and leads to discoloration in the polysiloxane-polycarbonate block cocondensate product. Therefore, in the process according to the invention, the intention is to use siloxane blocks which do not have to be prepared via processes which entail ruthenium and/or platinum catalysis and which do not contain impurities that could be dentrimental to the properties of the resulting cocondensate product. Such unwanted impurities could be for example strong bases in general, salts of hydroxy- or halogen ions amines and heavy metals, It has been possible, surprisingly, to develop a process in which conventionally available polycarbonates can be reacted with specific hydroxyaryl-terminated polysiloxanes under particular conditions to give high-quality polysiloxane-polycarbonate block cocondensates.

DETAILED DESCRIPTION OF THE INVENTION

It has been shown that, in a specific reactive extrusion process, high molecular weight polysiloxane-polycarbonate block cocondensates featuring high quality, especially a high melt stability and good processability, are obtainable. The process according to the invention further has the advantage of requiring no solvents and fewer or no subsequent purification steps compared to the processes of the prior art.

It has been recognized that, surprisingly, known reactive extrusion processes, as described, for example, in U.S. Pat. Nos. 5,414,054 and 5,821,321, do not lead to the desired high molecular weight block cocondensates in the case of the inventive siloxane blocks selected. This was surprising since, in the US applications mentioned, incorporation of the siloxane component into the polycarbonate via reactive extrusion was possible. In this case, in contrast, neither incorporation of the siloxane block nor an increase in the molecular weight was achieved.

It was further found, surprisingly, that adding salts of weak acids to the siloxane could speed up the cocondensation. It was surprisingly found that by adding certain salts of weak acids to the siloxane, the residence time in the reactor could be reduced significantly while not affecting the melt stability of the resulting copolymer. Thus, the throughput in the reactor could be increased considerably.

The present invention therefore provides a reactive extrusion process for preparing polysiloxane-polycarbonate block cocondensates, in which at least one hydroxyaryl-terminated polydialkyl siloxane (siloxane components) is reacted with at least one polycarbonate in the melt in a reactor combination consisting of a preliminary reactor and a high-viscosity reactor, preferably at temperatures within the range of from 280° C. to 400° C., preferably of 300° C. to 390° C., more preferably of 320° C. to 380° C. and most preferably of 330° C. to 370° C. (in each case present in the high-viscosity reactor), and pressures of 0.001 mbar to 50 mbar, preferably 0.005 mbar to 40 mbar, especially preferably 0.02 to 30 mbar, and most preferably 0.03 to 5 mbar (in each case present in the high-viscosity reactor), preferably in the presence of a catalyst.

The preliminary reactor used is preferably a single-screw or twin-screw extruder, especially preferably a twin-screw extruder. The processing temperature (melt temperature) is preferably 280° C. to 400° C., preferably 300 to 380° C., and at least one stage of the extruder is operated at an absolute pressure of 0.1 to 100 mbar and more preferably at an absolute pressure of 0.5 to 50 mbar.

The reactive extrusion process is preferably performed in an at least two-stage process, wherein the reactor combination preferably consists of a twin- or single-screw extruder and a high-viscosity reactor, and the low molecular weight dissociation products formed are removed by vaporization under reduced pressure. In the twin- or single-screw extruder, the polycarbonate is melted, and the further feedstocks such as silicone component and any catalysts are also added, optionally in the form of masterbatches. In addition, the mixing and preliminary reaction of the components are effected here. The preliminary product is then fed to the high-viscosity reactor in which it reacts fully to give the polycondensation product with simultaneous supply of thermal and mechanical energy under reduced pressure. The volatile low molecular weight dissociation products (low molecular weight condensation products like phenol) and other low molecular weight constituents can be drawn off in the preliminary reactor (single- or twin-screw extruder), downstream of the preliminary reactor and/or in the high-viscosity reactor. In a preferred embodiment, low molecular weight constituents are removed under reduced pressure at the early stage of the preliminary reactor. This is preferably done in two vacuum stages, in which case the first vacuum stage is operated preferably at an absolute pressure of 10 to 800 mbar and more preferably at an absolute pressure of 50 to 500 mbar, and the second vacuum stage preferably at absolute pressure 0.1 to 100 mbar and more preferably at absolute pressure 0.5 to 50 mbar. The reaction in the high-viscosity reactor is likewise performed under reduced pressure. The reduced pressure is 0.001 mbar to 50 mbar, preferably 0.005 mbar to 40 mbar, especially preferably 0.02 to 30 mbar and most preferably 0.03 to 5 mbar absolute.

The high-viscosity reactors used in accordance with the invention are apparatuses suitable for the processing of high-viscosity materials, which provide sufficient residence time with good mixing and subject the melt to the reduced pressure required in accordance with the invention. The patent literature describes numerous apparatuses which meet these requirements in principle and which can be used in accordance with the invention. For example, it is possible to use reactors according to EP 460 466 (LeA27024), EP 528 210, EP 638 354, EP 715 881, EP 715 882, EP 798 093, or those according to EP 329 092, according to EP 517 068, EP 1 436 073 or WO 20021114, or those according to EP 222 599.

Preference is given to using a reactor according to EP 460 466 (LeA27024), which has kinematic self-cleaning, and consists of two or more parallel shafts which rotate in the same sense, on which there are axially offset, not necessarily circular discs with strippers distributed on the circumference thereof, and surrounding housing. This reactor/mixer is characterized in that all surfaces of the strippers are kinematically cleaned, in that, especially with shafts rotating at equal speed, in any radial section through the mixer, all outward-pointing surfaces of the strippers a shaft are concentric to the centre of rotation if they are cleaned by the housing, but otherwise have approximately the axis separation as the radius of curvature and are convex and are cleaned by an adjacent shaft or the strippers thereof, in that, especially with rotors rotating at equal speed, all inward-pointing surfaces of the strippers of a shaft, in any radial section through the mixer, have approximately the axis separation as the radius of curvature and are concave and are cleaned by strippers of another adjacent shaft. For better mixing, the melt can be conducted through further mixing elements. For example, a static mixture can be used between the preliminary reactor and the high-viscosity reactor.

For discharge of the reacted cocondensates from the high-viscosity reactor, in accordance with the invention, a single-screw screw, a twin-screw screw or a gear pump is used. Optionally, additives and/or admixtures are also fed and mixed in. The admixtures can be mixed in in the discharge unit or in a downstream static mixer. The melt is formed by means of one or more nozzles and comminuted with a pelletizing apparatus according to the prior art.

Through the process according to the invention, the corresponding block cocondensates are obtainable within short reaction times. "Short reaction time" in this context means the reaction time which is required to condensate the low molecular weight polycarbonate (from a molten state) to the block cocondensate having the target viscosity and having incorporated the siloxane component. The reaction time is preferably less than one hour, especially preferably less than 50 minutes and most preferably less than 40 minutes. In a particularly preferred embodiment, the reaction time is less than 30 minutes and especially preferably less than 20 minutes.

The inventive product obtained by the process according to the invention is preferably notable for the following features: an elevated melt stability at high processing temperatures (280 to 350° C.) and high structural viscosity. These features can also be found in conventional products, i.e. those obtained by the interfacial process, but the melt stability is lower and the structural viscosity is not as marked. Moreover, the inventive block cocondensate exhibits a higher critical wall thickness compared to conventional bisphenol A-based polycarbonate.

"$C_1$-$C_4$-alkyl" in the context of the invention is, for example, methyl, ethyl, n-propyl, isopropyl, n-butyl, sec-butyl, tert-butyl; "$C_1$-$C_6$-alkyl" is additionally, for example, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl or 1-ethyl-2-methylpropyl; "$C_1$-$C_{10}$-alkyl" is additionally, for example, n-heptyl and n-octyl, pinacyl, adamantyl, the isomeric menthyls, n-nonyl, n-decyl; $C_1$-$C_{34}$-alkyl is additionally for example, n-dodecyl, n-tridecyl, n-tetradecyl, n-hexadecyl or n-octadecyl. The same applies to the corresponding alkyl radical, for example, in aralkyl or alkylaryl, alkylphenyl or alkylcarbonyl radicals. Alkylene radicals in the corresponding hydroxyalkyl or aralkyl or alkylaryl radicals are, for example, alkylene radicals corresponding to the above alkyl radicals.

"Aryl" is a carbocyclic aromatic radical having 6 to 34 skeletal carbon atoms. The same applies to the aromatic moiety of an arylalkyl radical, also called aralkyl radical, and to aryl constituents of more complex groups, for example arylcarbonyl radicals.

Examples of "$C_6$-$C_{34}$-aryl" are phenyl, o-, p-, m-tolyl, naphthyl, phenanthrenyl, anthracenyl or fluorenyl.

"Arylalkyl" or "aralkyl" is in each case independently a straight-chain, cyclic, branched or unbranched alkyl radical as defined above, which may be singly, multiply or fully substituted by aryl radicals as defined above.

The above enumerations should be understood by way of example and not as a limitation.

In the context of the present invention, ppm and ppb—unless stated otherwise—are understood to mean parts by weight.

The siloxane component used is preferably a polysiloxane of the formula (1)

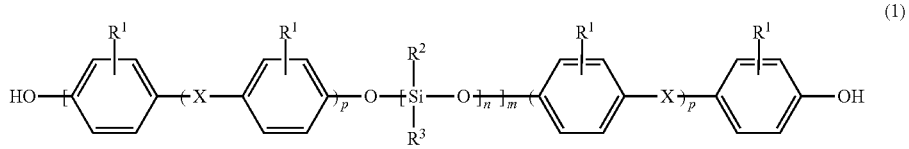

(1)

in which

R$^1$ is H, Cl, Br or C$_1$ to C$_4$-alkyl, preferably H or methyl, and especially preferably H, R$^2$ and R$^3$ are the same or different and each independently from one another selected from aryl, C$_1$ to C$_{10}$-alkyl and C$_1$ to C$_{10}$-alkylaryl, preferably R$^2$ and R$^3$ are methyl, X is a single bond, —CO—, —O—, C$_1$- to C$_5$-alkylene, C$_2$ to C$_5$-alkylidene, C$_5$ to C$_{12}$-cycloalkylidene or C$_6$ to C$_{12}$-arylene which may optionally he fused to further aromatic rings containing heteroatoms, X preferably being a single bond, C$_1$ to C$_5$-alkylene, C$_2$ to C$_5$-alkylidene, C$_5$ to C$_{12}$-cycloalkylidene, —O—, —CO—, X more preferably being a single bond, isopropylidene. C$_5$- to C$_{12}$-cycloalkylidene or oxygen, and most preferably isopropylidene, n is a number from 1 to 500, preferably from 10 to 400, especially preferably from 10 to 100, most preferably from 20 to 60, m is a number from 1 to 10, preferably from 1 to 6, especially preferably from 2 to 5, and p is 0 or 1, preferably 0, and the value of n times m is preferably between 12 and 400, more preferably between 15 and 200.

The weight-average molecular weight of the siloxane component is preferably 3000 to 20 000 g/mol, determined by means of gel permeation chromatography and BPA (bisphenol A) Standard, and especially preferably 3500-15 000 g/mol.

Very particular preference is given to using, as the siloxane component, hydroxyaryl-terminated siloxanes of the formula (1) where the R$^2$ and R$^3$ radicals are both methyl and the R$^1$ radical is hydrogen, and p is 0.

The siloxanes of the formula (1) can be prepared by a process including the step of reacting a linear α,ω-bisacyloxy-polydialkylsiloxane of the general formula (2) with at least one aromatic compound having at least two phenolic hydroxy groups, wherein the general formula (2) is

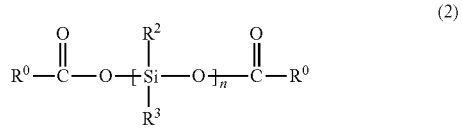

(2)

in which

R$^0$ is aryl, C$_1$ to C$_{10}$-alkyl or C$_1$ to C$_{10}$-alkylaryl,

R$^2$ and R$^3$ are the same or different and each independently from one another selected from aryl, C$_1$ to C$_{10}$-alkyl and C$_1$ to C$_{10}$-alkylaryl, preferably R$^2$ and R$^3$ are both methyl, and n is a number from 1 to 500, preferably from 10 to 400, especially preferably from 10 to 100, most preferably from 20 to 60, and wherein the compound of formula (2) and the aromatic compound are reacted in such a molar ratio that the ratio of the phenolic hydroxyl groups in the aromatic compound to the acyloxy groups in the compound of formula (2) is less than 2.0.

In a particularly preferred embodiment, the aromatic compound having at least two phenolic hydroxy groups is a bisphenolic compound or a hydroxyl-functional oligomer thereof.

The preparation of the siloxane of formula (1) is preferably performed in an inert solvent, preferably selected from aromatic hydrocarbons such as toluene, xylenes, chlorobenzene and the like, and polar organic acids, such as acetic acid and other C3 to C6 organic carboxylic acids. The reaction can be performed in the presence of a catalyst, which is preferably selected from the metal salts of organic acids, such as sodium or potassium acetate. Other catalysts known in the art to catalysed siloxane condensation reactions can also be used.

In the process according to the invention, the siloxane component of the formula (1) is used preferably in an amount of 0.5 to 50% by weight, more preferably of 1 to 40% by weight, especially preferably of 2 to 20%, most preferably of 2.5 to 10%, by weight, and in particular 2.5% by weight to 7.5% by weight, based in each case on the polycarbonate used.

Polycarbonates in the context of the present invention are both homopolycarbonates and copolycarbonates.

The polycarbonates for use in accordance with the invention, including the polyestercarbonates, can be prepared by the known interfacial process with phosgene or by the known melt transesterification process. Polycarbonates prepared by melt transesterification are particularly preferred.

Some, preferably up to 80 mol %, more preferably from 20 mol % up to 50 mol %, of the carbonate groups in the polycarbonates suitable in accordance with the invention may be replaced by aromatic dicarboxylic ester groups. Such polycarbonates, which contain both acid radicals of the carbonic acid and acid radicals of aromatic dicarboxylic acids incorporated into the molecule chain, are, to be exact, aromatic polyestercarbonates. For the sake of simplicity, they are to be covered in the present application by the umbrella term of thermoplastic aromatic polycarbonates.

Polycarbonates are prepared in a known manner from diphenols, carbonic acid derivatives, optionally chain terminators and optionally branching agents, with replacement of a portion of the carbonic acid derivatives by aromatic dicarboxylic acids or derivatives of the dicarboxylic acids for preparation of the polyestercarbonates, specifically by aromatic dicarboxylic ester structural units according to the carbonate structural units to be replaced in the aromatic polycarbonates.

By way of example for the preparation of polycarbonates, reference is made here to Schnell, "Chemistry and Physics of Polycarbonates", Polymer Reviews, Volume 9, Interscience Publishers, New York, London, Sydney 1964.

Diphenols suitable for the process according to the invention for preparation polycarbonates have been described many times in the prior art.

Suitable diphenols are, for example, hydroquinone, resorcinol, dihydroxydiphenyl, bis(hydroxylphenyl)alkanes, bis (hydroxyphenyl) sulphides, bis(hydroxyphenyl) ethers, bis (hydroxyphenyl) ketones, bis(hydroxyphenyl) sulphones, bis(hydroxyphenyl) sulphoxides, α,α'-bis(hydroxylphenyl) diisopropylbenzenes, and the alkylated, ring-alkylated and ring-halogenated compounds thereof.

Preferred diphenols are 4,4'-dihydroxydiphenyl, 2,2-bis (4-hydroxyphenyl)1-phenylpropane, 1,1-bis(4-hydroxyphenyl)phenylethane, 2,2-bis(4-hydroxyphenyl)propane, 2,4-bis(4-hydroxyphenyl)2-methylbutane, 1,3-bis[2-(4-hydroxyphenyl)2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)2-methylbutane and 1,3-bis[2-(3,5-dimethy)-4-hydroxyphenyl)2-propyl]benzene.

Particularly preferred diphenols are 4,4'-dihydroxydiphenyl, 1,1-bis(4-hydroxyphenyl)phenylethane and 2,2-bis(4-hydroxyphenyl)propane, 2,2-bis(3,5-dimethyl-4-hydroxyphenyl)propane. These and further suitable other dihydroxyaryl compounds are described, for example, in DE-A 3 832 396, FR-A 1 561 518, in H. Schnell, Chemistry and Physics of Polycarbortates, Interscience Publishers, New York 1964, p. 28 ff.; p. 102 ff. and in D. G. Legrand, J. T. Bendier, Handbook of Polycarbonate Science and Technology, Marcel Dekker New York 2000, p. 72 ff.

In the case of the homopolycarbonates, only one diphenol is used; in the case of the copolycarbonates, a plurality of diphenols are used; it will be appreciated that the diphenols used, and also all the other chemicals and assistants added to the synthesis, may be contaminated with the impurities originating from their own synthesis, handling and storage, although it is desirable to work with raw materials of maximum cleanliness.

The diaryl carbonates suitable for the reaction with the dihydroxyaryl compounds in the melt transesterification are those of the general formula (3)

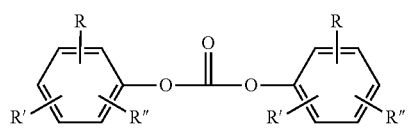

(3)

in which
R, R' and R" are the same or different and are each independently hydrogen, linear or branched $C_1$-$C_{34}$-alkyl, $C_7$-$C_{34}$-alkylaryl or $C_6$-$C_{34}$-aryl,
R may additionally also be —COO—R''' where R''' is hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4-isooctylphenyl phenyl carbonate, di(4-isooctylphenyl) carbonate, 4-n-nonylphenyl phenyl carbonate, di(4-n-nonylphenyl)carbonate, 4-cyclohexylphenyl phenyl carbonate, di(4-cyclohexylphenyl) carbonate, 4-(1-methyl-1-phenylethyl)phenyl phenyl carbonate, di [4-(1-methyl-1-phenylethyl)phenyl] carbonate, biphenyl-4-yl phenyl carbonate; di(biphenyl-4-yl) carbonate, 4-(1-naphthyl)phenyl phenyl carbonate, 4-(2-naphthyl)phenyl phenyl carbonate, di [4-(1-naphthyl)phenyl] carbonate, di[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphertyl phenyl carbonate, di(4-tritylphenyl) carbonate, (methyl salicylate) phenyl carbonate, di(methyl salicylate) carbonate, (ethyl salicylate) phenyl carbonate, di(ethyl salicylate) carbonate, (n-propyl salicylate) phenyl carbonate, di(n-propyl salicylate) carbonate, (isopropyl salicylate) phenyl carbonate, di(isopropyl salicylate) carbonate, (n-butyl salicylate) phenyl carbonate, di(n-butyl salicylate) carbonate, (isobutyl salicylate) phenyl carbonate, di(isobutyl salicylate) carbonate, (tert-butyl salicylate) phenyl carbonate, di(tert-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl-phenyl carbonate, di(biphenyl-4-yl) carbonate, 4-(1-methyl-1-phenylethyl)phenyl phenyl carbonate, di[4-(1-methyl-1-phenylethyl)phenyl] carbonate and di(methyl salicylate) carbonate.

Very particular preference is given to diphenyl carbonate. It is possible to use either one diaryl carbonate or else various diaryl carbonates.

The diaryl carbonates can also be used with residual contents of the monohydroxyaryl compounds from which they have been prepared. The residual contents of the monohydroxyaryl compounds may be up to 20% by weight, preferably up to 10% by weight, more preferably up to 5% by weight and most preferably up to 2% by weight.

The polycarbonates can be modified in a conscious and controlled manner by the use of small amounts of chain terminators and branching agents. Suitable chain terminators and branching agents are known from the literature. Some are described, for example, in DE-A 38 33 953. Preferably used chain terminators are phenol or alkylphenols, in particular phenol, p-tert-butyl-phenol, isooctylphenol, cumylphenol, the chlorocarbonic acid esters thereof or acid chlorides of monocarboxylic acids or mixtures of these chain terminators. Preferred chain terminators are phenol, cumylphenol, isooctylphenol, para-tert-butylphenol, and in particular phenol.

Examples of compounds suitable as branching agents are aromatic or aliphatic compounds having at least three, preferably three or four, hydroxyl groups. Particularly suitable examples having three or more than three phenolic hydroxyl groups are phloroglucinol, 4,6-dimethyl-2,4,6-tri (4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol, tetra(4-hydroxyphenyl)methane.

Examples of other trifunctional compounds suitable as branching agents are 2,4-dihydroxybenzoic acid, trimesic acid, cyanuric chloride and 3,3-bis(3-methyl-4-hydroxyphenyl)-2-oxo-2,3-dihydroindole.

Particularly preferred branching agents are 3,3-bis(3-methyl-4-hydroxyphenyl)-2-oxo-2,3-dihydroindole and 1,1,1-tri(4-hydroxyphenyl)ethane.

The catalysts used in the melt transesterification process for preparation of polycarbonates may be the basic catalysts known in the literature, for example alkali metal and alkaline earth metal hydroxides and oxides and/or onium salts, for example ammonium or phosphonium salts, Preference is given to using onium salts in the synthesis, more preferably phosphonium salts. Such phosphonium salts are, for example, those of the general formula (4)

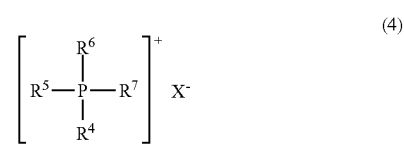

(4)

in which

R$^{4-7}$ are identical or different, optionally substituted C$_1$-C$_{10}$-alkyl, C$_6$-C$_{14}$-aryl, C$_7$-C$_{15}$-arylalkyl or C$_5$-C$_6$-cycloalkyl radicals, preferably methyl or C$_6$-C$_{14}$-aryl, more preferably methyl or phenyl, and X$^-$ is an anion selected from the group of hydroxide, sulphate, hydrogensulphate, hydrogencarbonate, carbonate, halide, preferably chloride, and alkoxide or aroxide of the formula —OR$^8$ where R$^8$ is an optionally substituted C$_6$-C$_{14}$-aryl, C$_7$-C$_{15}$-atylalkyl, C$_5$-C$_6$-eyeloalkyl or C$_1$-C$_{20}$-alkyl radical, preferably phenyl.

Particularly preferred catalysts are tetraphenylphosphonium chloride, tetraphenylphosphonium hydroxide and tetraphenylphosphonium phenoxide, very particular preference being given to tetraphenylphosphonium phenoxide.

The catalysts are used preferably in amounts of $10^{-8}$ to $10^{-3}$ mol, more preferably in amounts of $10^{-7}$ to $10^{-4}$ mol, based on one mole of dihydroxyatyl compound.

It is optionally also possible to use cocatalysts in order to increase the rate of polycondensation.

These may, for example, be alkaline salts of alkali metals and alkaline earth metals, such as hydroxides, optionally substituted C$_1$-C$_{10}$-alkoxides and C$_6$-C$_{14}$-aroxides of lithium, sodium and potassium, preferably hydroxides, optionally substituted C$_1$-C$_{10}$-alkoxides or C$_6$-C$_{14}$-aroxides of sodium. Preference is given to sodium hydroxide, sodium phenoxide or the disodium salt of 2,2-bis(4-hydroxyphenyl) propane.

If alkali metal or alkaline earth metal ions are supplied in the folin of their salts, the amounts of alkali metal or alkaline earth metal ions, determined, for example, by atomic absorption spectroscopy, is 1 to 500 ppb, preferably 5 to 300 ppb and most preferably 5 to 200 ppb, based on polycarbonate to be formed. In preferred embodiments of the process according to the invention, however, no alkali metal salts are used.

The performance of the polycarbonate synthesis may be continuous or batchwise.

In a particular embodiment, polycarbonates having a water content of 0.01 to 0.40 and preferably 0.05 to 0.35% by weight are used.

Preferably, the polycarbonate has a weight-average molecular weight of 16 000 to 28 000 g/mol, preferably of 17 000 to 27 000 g/mol, and especially preferably of 18 000 to 26 500 glmol, deteimined by means of gel permeation chromatography and BPA (bisphenol A) standard, and phenolic OH groups in an amount of 250 ppm to 1000 ppm, preferably 300 to 900 ppm and especially preferably of 350 to 800 ppm. In a preferred embodiment, the polycarbonate has a relative solution viscosity (eta rel) of 1.16 to 1.30, preferably 1.17 to 1.28, and more preferably 1.18 to 1.27, determined in dichloromethane at a concentration of 5 g/l at 25° C. using a Ubbelohde viscosimeter.

In a particularly preferred embodiment, polycarbonate containing particular rearrangement structures are used. The polycarbonates for use in this embodiment contain at least one, more preferably more than one, of the following structures (I) to (IV):

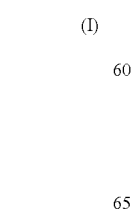

(I)

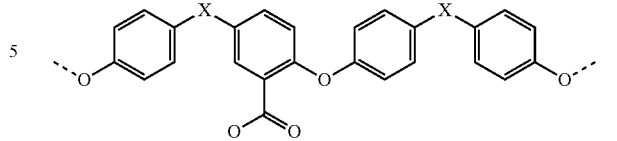

(II)

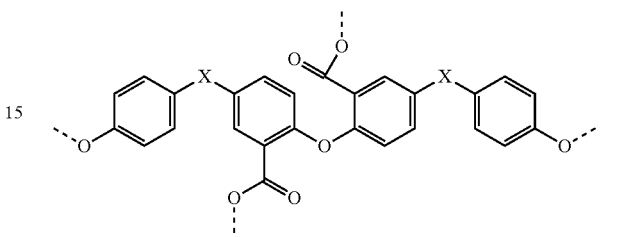

(III)

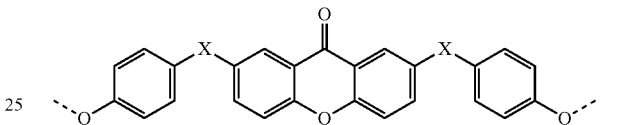

(IV)

in which the phenyl rings are unsubstituted or independently mono- or disubstituted by C$_1$ to C$_8$-alkyl and/or halogen, preferably C$_1$ to C$_4$-alkyl, more preferably methyl, and X is a single bond, C$_1$ to C$_5$-alkylene, C$_2$ to C$_5$-alkylidene or C$_5$ to C$_6$-cycloalkylidene, preferably a single bond or C$_1$ to C$_4$-alkylene, and especially preferably isopropylidene, the linkages indicated by - - - in the structural units (I) to (IV) are each part of a carboxylate group.

In a preferred embodiment the amount of the structural units (1) to I totals 60 to 1500 ppm more preferably 70 to 1200 ppm, and most preferably 80 to 850 ppm (determined after hydrolysis, based on the polycarbonate).

The rearrangement structures mentioned may occur in different amounts and ratios relative to one another. The amounts thereof can be determined by total hydrolysis of the polycarbonate composition.

In order to determine the amount of the rearrangement structures, the particular polycarbonate is subjected to a total hydrolysis and the corresponding degradation products of the formulae (Ta) to (IVa) are thus formed, the amount of which is determined by HPLC. (This can be done, for example, as follows: the polycarbonate sample is hydrolysed under reflux by means of sodium methoxide. The corresponding solution is acidified and concentrated to dryness. The drying residue is dissolved in acetonitrile and the phenolic compounds of the formula (Ia) to (IVa) are determined by means of HPLC with UV detection:

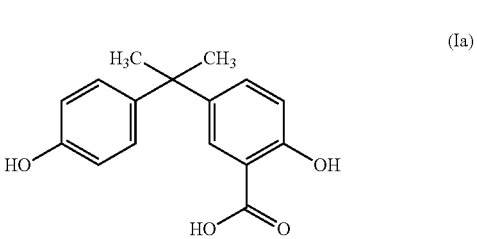

(Ia)

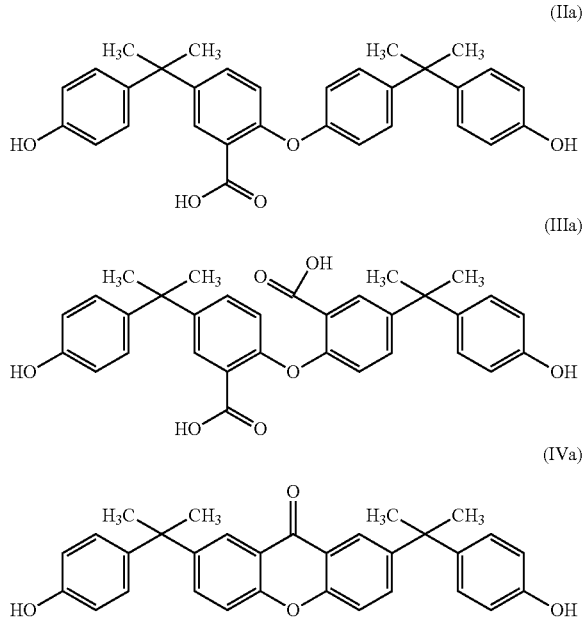

Preferably, the amount of the compound of the formula (Ia) released is 20 to 800 ppm, more preferably 25 to 700 ppm and especially preferably 30 to 500 ppm, based on the polycarbonate.

Preferably, the amount of the compound of the formula (IIa) released is 0 (i.e. below the detection limit of 10 ppm) to 100 ppm, more preferably 0 to 80 ppm and especially preferably 0 to 50 ppm, based on the polycarbonate.

Preferably, the amount of the compound of the formula (IIIa) released is 10 to 800 ppm, further preferably 10 to 700 ppm and more preferably 20 to 600 ppm, and most preferably 30 to 350 ppm, based on the polycarbonate.

Preferably, the amount of the compound of the formula (IVa) released is 0 (i.e. below the detection limit of 10 ppm) to 300 ppm, preferably 10 to 250 ppm and most preferably 20 to 200 ppm, based on the polycarbonate.

For reasons of simplification, the amount of the structures of the formula (I) to (IV) is equated to the respective amount of the compounds of the formula (Ia) to (IVa) released.

Where the polycarbonates used in accordance with the invention contain the rearrangement structures (I) to (IV), they are also present in the cocondensates obtained in accordance with the invention.

Preference is given to reacting the polycarbonate for use in accordance with the invention and the siloxane for use in accordance with the invention by means of catalysts. It is also possible in principle to conduct the reaction without catalyst, but in that case it may be necessary to accept higher temperatures and longer residence times.

Catalysts suitable for the process according to the invention are, for example, ammonium catalysts, for example tetramethylammonium hydroxide, tetramethylaininonium acetate, tetramethylammonium fluoride, tetrarnethylammoni Li tn tetraphenylboranate, dimethyldiphenylammonium hydroxide, tetraethylammonium hydroxide, cetyltrimethylammonium tetraphenylboranate and cetyltrimethylammonium phenoxide.

Especially suitable catalysts are phosphonium catalysts of the formula (5):

where $R^a$, $R^b$, $R^c$ and $R^d$ may be identical or different $C_1$-$C_{10}$-alkyls, $C_6$-$C_{14}$aryls, $C_7$-$C_{15}$-arylalkyls or $C_5$-$C_6$-cycloalkyls, preferably methyl or $C_6$-$C_{14}$-aryls, more preferably methyl or phenyl, and $Y^-$ may be an anion such as hydroxide, sulphate, hydrogensulphate, hydroizericarbonate, carbonate or a halide, preferably chloride, or an alkoxide or aroxide of the formula —$OR^e$ where $R^e$ may be a $C_6$-$C_{14}$-aryl, $C_7$-$C_{15}$-arylalkyl or $C_5$-$C_6$-cycloalkyl, preferably phenyl.

Particularly preferred catalysts are tetraphenylphosphonium chloride, tetraphenylphosphonium hydroxide and tetraphenylphosphonium phenoxide; very particular preference is given to tetraphenylphosphonium phenoxide.

The catalyst is used preferably in amounts of 0.0001 to 1.0% by weight, preferably from 0.001 to 0.5% by weight, especially preferably from 0.005 to 0.3% by weight and most preferably from 0.01 to 0.15% by weight, based on the overall composition.

The catalyst can be used alone or as a catalyst mixture and be added in substance or as a solution, for example in water or in phenol (for example as a cocrystal with phenol).

Catalysts suitable for the process according to the invention are those mentioned above, which are introduced into the reaction either by means of a masterbatch with a suitable polycarbonate, especially the above-described inventive polycarbonate, or can be added separately therefrom or in addition thereto.

The catalysts can be used alone or in a mixture and be added in substance or as a solution, for example in water or in phenol.

Preferably, the catalyst is added in pure form, as a mixture or in a masterbatch in the preliminary reactor, preferably in a twin-screw extruder.

In a preferred embodiment, reaction of the siloxane and the polycarbonate is performed in presence of at least one organic or inorganic salt of an acid having a $pK_A$ value within the range of from 3 to 7 (25° C.). Suitable acids include carboxylic acids, preferably $C_2$-$C_{22}$ carboxylic acids, such as acetic acid, propionic acid, oleic acid, stearic acid, lauric acid, benzoic acid, 4-methoxybenzoic acid, 3-methylbenzoic acid, 4-tert-butylbenzoic acid, p-tolylacetic acid, 4-hydroxyberizoic acid and salicylic acid, partial esters of polycarboxylic acids, such as monoesters of succinic acid, partial esters of phosphoric acid, such as mono- or diorgano phosphoric acid esters, branched aliphatic carboxylic acids, such as 2,2-dimethylpropanoic acid, 2,2-dimethylbutanoic acid, 2,2-dimethylpentanoic acid and 2-ethylhexanoic acid.

The organic or inorganic salt is preferably used in addition to the catalyst of formula (5); and in this embodiment the organic or inorganic salt acts as co-catalyst.

Preferably, the organic or inorganic salt is selected from the group consisting of alkali metal salts, earth alkaline metal salts, quaternary ammonium salts and quaternary phosphonium salts. Useful quaternary ammonium salts are selected from tetra-(n-butyl)-ammonium, tetraphenylammonium, tetrabenzylammonium and cetyltrimethylammonium salts. Useful quaternary phosphonium salts are selected from tetra-(n-butyl)-phosphonium, tetraphenylphosphonium, tetrabenzylphosphonium and cetyltrimethylphosphonium salts. Especially preferred are alkali metal salts and earth alkaline metal salts.

Useful organic and inorganic, salts are or are derived from sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium oleate, lithium oleate, potassium oleate, sodium benzoate, potassium benzoate, lithium benzoate, disodium, dipotassium and dilithium salts of bisphenol A. Furthermore the salts may include calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate and the respective oleates. These salts may be used singly or in combination.

In a particular preferred embodiment, the salt is selected from the group consisting of alkali metal salts and phosphonium salts of carboxylic acids.

In a preferred embodiment, the salt is derived from a carboxylic acid.

The organic or inorganic salts are used preferably in amounts of 0.5 to 1000 ppm, more preferably 1 to 100 ppm, and most preferably 1 to 10 ppm, based on the total weight of the siloxane and the organic or inorganic salt. Preferably, the organic or inorganic salts are used in amounts of 0.0005 to 5 mmol/kg, more preferably 0.001 to 1 mmol/kg, and most preferably 0.001 to 0.5 mmol/kg, based on the total weight of the siloxane, the polycarbonate and the organic or inorganic salt.

In a preferred embodiment, the organic or inorganic salt is a sodium salt, preferably a sodium salt of a carboxylic acid and is preferably used in such an amount that the sodium content in the resulting polysiloxane-polycarbonate block cocondensate is within the range of from 50 ppb to 100 ppm, preferably 80 ppb to 10 ppm, more preferably 100 ppb to 5 ppm and in particular 150 ppb to 3 ppm, based on the total weight of the polysiloxane-polycarbonate block cocondensate to be formed. In a preferred embodiment, the organic or inorganic salt is used in such an amount that the sodium content in the resulting polysiloxane-polycarbonate block cocondensate is within the range of from 0.1 ppm to 1000 ppm, preferably 0.2 to 100 ppm, more preferably 0.3 to 10 ppm and in particular 0.4 to 5 ppm, based on the total weight of the polysiloxane-polycarbonate block cocondensate to be formed. The sodium content of the cocondensate can be determined, for example, by atomic absorption spectroscopy.

The organic or inorganic salt can be used alone or as a mixture and he added in substance or as a solution. In a preferred embodiment, the inorganic or organic salt is added in form of a mixture containing the siloxane and the organic or inorganic salt. Preferably, the mixture is obtained by mixing the siloxane and the organic or inorganic salt and optionally one or more polar organic compounds having up to 30, preferably up to 20 carbon atoms, and at least one heteroatom, preferably selected from O, N and S, and optionally heating the mixture, for example to a temperature of 50° C. to 300° C., until it becomes clear and then cooling to room temperature. The polar organic compound can be removed before adding the mixture to the polycarbonate or thereafter, preferably by distillation.

Suitable polar organic compounds are selected from the group consisting of organic ketones, esters and alcohols. Alcohols, especially primary alcohols having up to 20 carbon atoms, such as 1-octanol, 1-decanol, 2-ethylhexanol, 1-dodecanol, 1,2-octanediol, benzyl alcohol, ethylhexylglycerin and oleoyl alcohol are particularly preferred. Preferably, the polar organic compound has a boiling point of less than 300° C. (at 1.013 bar).

Preferably, the polysiloxane-polycarbonate block cocondensate obtainable by the process according to the invention has a relative solution viscosity of 1.26 to 1.40, more preferably of 1.27 to 1.38, and especially preferably of of 1.28 to 1.35, determined in dichloromethane at a concentration of 5 g/l at 25° C. using a Ubbelohde viscosimeter. Preferably, the polysiloxane-polycarbonate block cocondensate obtainable by the process according to the invention has a weight average molecular weight of 26,000 to 40,000 g/mol, more preferably 27,000 to 38,000 g/mol, and most preferably 28,000 to 35,000 g/mol, determined by measuring the relative solution viscosity in dichloromethane at a concentration of 5 g/l at 25° C. using a Ubbelohde viscosimeter.

It is possible to add additives and/or fillers and reinforcers to the polysiloxane-polycarbonate block cocondensates obtainable by the process according to the invention. Additives are preferably used in amounts of 0.0% by weight to 5.0% by weight, preferably 0% by weight to 2,00% by weight, and most preferably 0% by weight to 1.00% by weight. The additives are standard polymer additives, for example the following which are described in EP-A 0 839 623, WO-A 96/15102, EP A 0 500 496 or "Plastics Additives Handbook", Hans Zweifel, 5th Edition 2000, Hanser Verlag, Munich: flame retardants, UV stabilizers, gamma stabilizers, antistats, optical brighteners, flow improvers, thermal stabilizers, inorganic pigments, demoulding agents or processing aids. Fillers and/or reinforcers can be used in amounts of 0% by weight to 50% by weight, preferably 0% by weight to 20% by weight, more preferably 0% by weight to 12% by weight, and in particular 0% by weight to 9% by weight.

These additives, fillers and/or reinforcers can be added to the polymer melt individually or in any desired mixtures or a plurality of different mixtures, and additives can specifically be supplied directly in the course of insulation of the polymer (for example via a side unit such as a side extruder) as a pure substance or as a masterbatch in polycarbonate, or else after melting of granules in a compounding step. The additives or mixtures thereof can be added to the polymer melt in solid form, i.e. as a powder, or as a melt. Another method of metered addition is the use of masterbatches or mixtures of masterbatches of the additives or additive mixtures.

In a preferred embodiment, the polymer composition comprises thermal stabilizers or processing stabilizers. Preferentially suitable are phosphites and phosphonites, and also phosphines. Examples are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis (2,4-di-tert-butylphenyl) pentaerythrityl diphosphite, bis(2,4-di-cumylphenyl) pentaerythrityl diphosphite, bis(2,6-di-tert-butyl-4-methylphenyl) pentaerythrityl diphosphite, diisodecyloxy pentaerythrityl diphosphite, bis(2,4-di-tert-butyl-6-methylphenyl) pentaerythrityl diphosphite, bis(2,4,6-tris-tert-butylphenyl) pentaerythrityl diphosphite, tristearylsorbitol triphosphite, tetrakis(2,4-di-tert-butylphenyl)4,4'-biphenylene diphosphonite, 6-isooctyloxy-2,4,8,10-tetra-tert-butyl-12H-dibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyldibenzo[d,g]-1,3,2-dioxaphosphocin, 2,2',2"-nitrilo-[triethyl tris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl) pentaerythrityl diphosphite, triphenylphosphine (TPP), trialkylphenylphosphine, bisdiphenylphosphinoethane or a trinaplithylphosphine. Especially preferred are triphenylphosphine (TPP), Irgafos® 168 (tris(2,4-di-tert-butylphenyl) phosphite) and tris(nonylphenyl) phosphite, or mixtures thereof.

It is additionally possible to use phenolic antioxidants such as alkylated monophenols, alkylated thioalkylphenols, hydroquinones and alkylated hydroquinones. Particular preference is given to using Irganox® 1010 (pentaerythrityl 3-(4-hydroxy-3,5-di-tert-butylphenyl)propionate; CAS: 6683-19-8) and Irganox 1076® (2,6-di-tert-butyl-4-(octadecanoxycarbonylethyl)phenol).

Suitable UV absorbers are described, for example, in EP 1 308 084 A1, in DE 102007011069 A1, and in DE 10311063 A1.

Particularly suitable ultraviolet absorbers are hydroxybenzotriazols such as 2-(3',5'-bis(1,1-dimethylbenzyl)2'-hydroxyphenyl)benzotriazole (Tinuvin® 234, BASF SE, Ludwigshafen), 2-(2'-hydroxy-5'-(tert-octyl)phenyl) benzotriazole (Tinuvin® 329, BASF SE, Ludwigshafen), 2-(2'-hydroxy-3'-(2-butyl)5'-(tert-butyl)phenyl)benzotriazole (Tinuvin® 350, BASF SE, Ludwigshafen), bis-(2H-benztriazolyl)2-hydroxy-5-tert-octyl)methane, (Tinuvin® 360, BASF SE, Ludwigshafen), 2-(4,6-diphenyl-1,3,5-triazin-2-yl)5-(hexyloxy)phenol (Tinuvin® 1577, BASF SE, Ludwigshafen), and the benzophenones 2,4-dihydroxybenzophenone (Chimasorb® 22, BASF SE, Ludwigshafen) and 2-hydroxy-4-(octyloxy)benzophenone (Chimassorb® 81, BASF SE, Ludwigshafen), 2-cyano-3,3-diphenyl-2-propenoic acid, 2,2-bis[[(2-cyano-1-oxo-3,3-diphenyl-2-propenyl)oxy]methyl]1,3-propanediyl ester (9CI) (Uvinul® 3030, BASF AG Ludwigshafen), 2-]2-hydroxy-4-(2-ethylhexyl) oxy]phenyl-4,6-di(4-phenyl)phenyl-1,3,5-triazine (Tinuvin® 1600, BASF SE, Ludwigshafen) or tetra ethyl-2,2'-(1, 4-phenylenedimethylidene)bismalonate (Hostavin® B-Cap, Clariant AG), It is also possible to use mixtures of these ultraviolet absorbers.

The inventive polymer compositions may optionally comprise demoulding agents. Particularly suitable demoulding agents for the inventive composition are pentaerythrityl tetrastearate (PETS) or glyceryl monostearate (GMS).

In addition, it is also possible to add other polymers to the block cocondensates obtainable in accordance with the invention, for example polycarbonate, polyester carbonate, polystyrene, styrene copolymers, aromatic polyesters such as polyethylene terephthalate (PET). PET-cyclohexanedimethanol copolymer (PETG), polyethylene naphthalate (PEN), polybutylene terephthalate (PAT), cyclic polyolefin, poly- or copolyacrylates and poly- or copolymethacrylate, for example poly- or copolymethylmethacrylates (such as PMMA), and copolymers with styrene, for example transparent polystyrene-acrylonitrile (PSAN), rubber-modified vinyl (co-)polymers, such as acrylonitrile butadiene styrene copolymer, thermoplastic polyurethanes, polymers based on cyclic olefins (e.g. TOPAS®, a commercial product from Ticona).

The block cocondensates obtainable by the process according to the invention can be processed in a manner known for thermoplastic polycarbonates to give any desired mouldings.

In this context, the inventive compositions can be converted, for example, by hot pressing, spinning, blow-moulding, thermoforming, extrusion or injection moulding to products, mouldings or shaped articles. Also of interest is the use of multilayer systems. The application may coincide with or immediately follow the shaping of the base structure, for example by coextrusion or multicomponent injection moulding. However, application may also be on to the ready-shaped base structure, for example by lamination with a film or by coating with a solution.

Sheets or mouldings composed of base layer and optional top layer/optional top layers (multilayer systems) can be produced by (co)extrusion, direct skinning, direct coating, insert moulding, film insert moulding, or other suitable processes known to those skilled in the art.

Injection moulding processes are known to those skilled in the art and are described, for example, in "Handbuch Spritzgiessen", Friedrich Johannaber/Walter Michaeli, Munich; Vienna: Hanser, 2001. ISBN 3-446-15632-1 or "Anleitung zum Bait von Spritzgiesswerkzeugen", Menges/Michaeli/Mohren, Munich; Vienna: Hauser, 1999, ISBN 3-446-21258-2.

Extrusion processes are known to those skilled in the art and are described, for example, for coextrusion, inter alia, in EP-A 0 110 221, EP-A 0 110 238 and EP-A 0 716 919. For details of the adapter and nozzle process, see Johannaber/Ast: "Kunststoff-Maschinenführer", Hanser Verlag, 2000 and in Gesellschaft Kunststofftechnik: "Coextrudierte Folien and Platten: Zukunftsperspektiven, Anforderungen, Anlagen and Herstellung, Qualitätssicherung", VDI-Verlag, 1990.

The polysiloxane-polycarbonate block cocondensates obtainable by the process according to the invention are usable wherever the known aromatic polycarbonates have been used to date, and wherever good flowability coupled with improved demoulding characteristics and high toughness at low temperatures and improved chemical resistance are additionally required, for example for production of large external motor vehicle parts and switch boxes for exterior use, and of sheets, cavity sheets, electric and electronic parts, and optical memory. For example, the block cocondensates can be used in the IT sector for computer housings and multimedia housings, mobile phone cases, and in the domestic sector, such as in washing machines, and in the sports sector, for example as a material for helmets.

In a particularly preferred embodiment of the process according to the invention, a polycarbonate having an OH end group content of 300 to 900 ppm and a weight-average molecular weight (measured with bisphenol A standard) and an OH-terminated polydialkylsiloxane of the formula (1) having a molecular weight of 3000 to 15000 g/mol (measured with bisphenol A standard), where $R^2$ and $R^3$ in formula (1) are methyl, p is 0 and m is a number from 1.5 to 5, are used.

EXAMPLES

Figure 1:
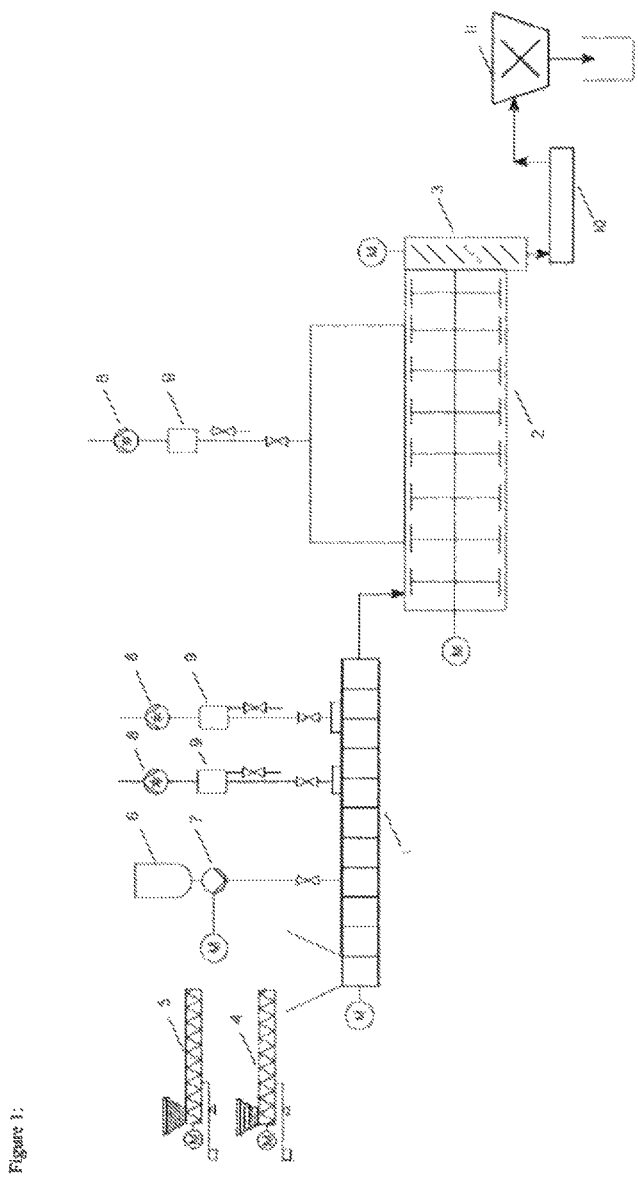
FIG. 1 shows a schematic representation of a setup for the preparation of siloxane-containing block copolycarbonates according to the invention. Polycarbonate and eventually a catalyst masterbatch of polycarbonate are metered via gravimetric feeders (4) and (5) to an extruder (1). Preferably a co-rotating twin-screw extruder exhibiting one or more vent sections is used. The screw configuration is designed according to the state of the art and is therefore not shown, The polysiloxane block is stored in a storage tank (6) and is metered to the extruder via a displacement pump (7). In a preferred embodiment, as shown in FIG. 1, there are four vented housings on the extruder. Vacuum is generated via two vacuum pumps (8) and the vapours, which are distracted from the extruder are condensed in two condensers (9). Configurations with less but with at least one vented housing or with only one vacuum level applied are also according to the invention. The premixed and devolatized melt is transferred to a high viscosity reactor (2), which is also connected to a vacuum pump (8) and a condenser (9). After completion of the reaction the polysiloxane-polycarbonate block cocondensates are discharged from the high viscosity reactor via a discharge screw (3). The polymer strands are cooled in a waterhath (10) and cut in a granulator (11).

The invention is described in detail hereinafter by working examples, the determination methods described here being employed for all corresponding parameters in the present invention, in the absence of any descriptions to the contrary.

Determination of Melt Volume Flow Rate (MVR):

The melt volume flow rate (MVR) is determined to ISO 1133 (at 300° C.; 1.2 kg), unless any other conditions have been described.

Determination of Solution Viscosity (eta rel):

The relative solution viscosity ($\eta_{rel}$; also referred to as eta rel) was determined in dichloromethane at a concentration of 5 g/l at 25° C. with an Ubbelohde viscometer.

Determination of Rearrangement Structures (Ia) to (IVa):

The polycarbonate sample is hydrolysed by means of sodium methoxide under reflux. The corresponding solution is acidified and concentrated to dryness. The drying residue is dissolved in acetonitrile and the phenolic compounds of the formulae (Ia) to (IVa) are determined by means of HPLC with UV detection. The structures (Ia) to (IVa) are unambiguously characterized by means of nuclear magnetic resonance spectroscopy (NMR).

Light Microscopy:

The incorporation characteristics of the siloxane component are checked via light microscopy. The presence of large amounts (in the micrometer range or greater) of silicone oil is a pointer to physical incorporation of the silicone component. No block cocondensate is present. If, in contrast, the average size of the silicone domains is below 1 μm, the presence of a block copolymer can be assumed.

Materials Used:

PC: linear bisphenol A polycarbonate having end groups based on phenol from Bayer MatcrialScience used with a melt volume index of 59-62 cm³/10 min (measured at 300° C. and load 1.2 kg to ISO 1033). This polycarbonate does not contain any additives such as UV stabilizers, demoulding agents or thermal stabilizers. The polycarbonate was prepared via a melt transesterifieation process as described in DE 102008019503. The polycarbonate has a phenol end group content of about 600 ppm.

Siloxane Component:

Siloxane 1 is a hydroquinone-terminated polydimethylsiloxane of the formula (1) (i.e. $R^1$=H, $R^2$, $R^3$=methyl, p=0), in which n=30 and m=3, having a hydroxy content of 8.8 mg KOH/g and a viscosity of 753 mPa·s (23° C.). The weight-average molecular weight is Mw=13 000 g/mol, determined by means of gel permeation chromatography (GPC) with bisphenol A standard; detection was effected by means of an IR detector at 1050 cm$^{-1}$.

The siloxane component can be prepared according to the following procedure:

In a reaction flask equipped with a thermostat heater, stirrer, thermometer, and reflux condenser, 250 g of an α,ω-bisacyloxypolydirnethylsiloxane, with an average chain length of 31.8 dimethylsiloxy units as determined by $^{29}$Si NMR and 230 mmoles of acyloxy terminal groups, is added dropwise over 4 hours to a solution of 35.1 g (150 mmoles) bisphenol-A in 50 g xylenes, 25 g acetic acid and 0.5 g of sodium acetate, while heating to a mild reflux at 105° C. After complete addition the clear solution is stirred for an additional hour. Then the solvents and volatiles are removed by vacuum distillation to 160° C. and 3 mbar pressure. After cooling the crude product is filtered over a 3 micron filter (Seitz K300) to give 236 g (83% theory) of a clear, colorless liquid.

Siloxanes 2 to 4 as described here below were prepared in an analogous manner.

Siloxane 2 is a hydroquinone-terminated polydimethylsiloxane of the formula (1) (i.e. $R^1$=H, $R^2$, $R^3$=methyl, p=0), in which n=31.4 and m=3.7, having a hydroxy content of 13.9 mg KOH/g and a viscosity of 307 mPa·s (23° C.). The weight-average molecular weight is Mw=7 800 Wmol, determined by means of gel permeation chromatography (GPC) with bisphenol A standard; detection was effected by means of an IR detector at 1050 cm$^{-1}$.

Siloxane 3 is a hydroquinone-terminated polydimethylsiloxane of the formula (1) (i.e. $R^1$=H, $R^2$, $R^3$=methyl, p=0), in which n=32 and m=3, having a hydroxy content of 12.5 mg KOH/g and a viscosity of 381 mPa·s (23° C.). The weight-average molecular weight is Mw=9 380 g/mol, determined by means of gel permeation chromatography (GPC) with bisphenol A standard; detection was effected by means of an IR detector at 1050 cm$^{31\ 1}$.

Siloxane 4 is a hydroquinone-terminated polydimethylsiloxane of the formula (1) (i.e. $R^1$=H, $R^2$, $R^3$=methyl, p=0), in which n=30 and m=3, having a hydroxy content of 14.9 mg KOH/g and a viscosity of 320 mPa·s (23° C.). The weight-average molecular weight is Mw=9 100 g/mol, determined by means of gel permeation chromatography (GPC) with bisphenol A standard; detection was effected by means of an IR detector at 1050 cm$^{-1}$.

Catalyst:

The catalyst used is tetrabenzylphosphonium phenoxide from Rhein Chemie Rheinau GmbH (Mannheim, Germany) in the form of a masterbatch. Tetraphenylphosphonium phenoxide is used in the form of a cocrystal with phenol and contains about 70% tetraphenylphosphonium phenoxide. The amounts which follow are based on the substance obtained from Rhein Chemie (as a cocrystal with phenol).

The masterbatch is used in the form of a 0.25% mixture. For this purpose, 4982 g are subjected to spin application of 18 g of tetraphenylphosphonium phenoxide in a drum hoop mixer for 30 minutes. The masterbatch is metered in in a ratio of 1:10, such that the catalyst is present with a proportion of 0.025% by weight in the total amount of polycarbonate.

Materials Used for Comparative Examples:

Makrolon 2808®: Linear polycarbonate from Bayer MaterialScience based on bisphenol A with phenol as end group with an MVR of 9.5.

Lexan® EXL 14141T: Linear siloxane-containing block cocondensate from Sabic Innovative Plastics based on bisphenol A with an MVR of 7.3, prepared by the via an interfacial process.

Lexan EXL 9330: Linear siloxane-containing block cocondensate comprising flame retardant from Sabic Innovative Plastics based on bisphenol A with an MVR of 8.8, prepared via an interfacial process.

Comparative Examples

Twin-screw Extruder

As a basis for comparison, experiments were first conducted according to the prior art with a single twin-screw extruder. The setup is thus similar to that as published in U.S. Pat. Nos. 5,414,054 and 5,821,321.

For reactive extrusion, a twin-screw extruder (ZSE 27 MAXX from Leistritz Extrusionstechnik GmbH, Nuremberg) is used. The extruder consists of 11 housing parts—see FIG. 1. In housing part 1 polycarbonate and catalyst masterbatch are added, and in housing 2 and 3 these components are melted. In housing part 4 the liquid silicone component is added. Housing parts 5 and 6 serve for incorporation of the silicone component. Housings 7 to 10 are provided with venting orifices in order to remove the condensation products. Housings 7 and 8 are assigned to the first vacuum stage, and housings 9 and 10 to the second. The reduced pressure in the first vacuum stage is between 250 and 500 mbar absolute pressure. The reduced pressure in the second vacuum stage can be found in Table 1. is less than 1 mbar. In zone 11, finally, the pressure buildup is effected, and then the discharge from the extruder with subsequent pelletization. Several experimental batches were run. In these, several process parameters such as speed, housing temperature and pressure in vacuum zone 2 were varied.

TABLE 1

| Ex. | PC kg/h | Cat. MB kg/h | Cat. % | Siloxane[1] kg/h | Speed rpm | Vacuum 2 mbar abs. | Housing temp. °C. | Visc. eta rel. | Incorporation (light microscopy) |
|---|---|---|---|---|---|---|---|---|---|
| 1 | 13.5 | 1.5 | 0.25 | 0.75 | 100 | Standard pressure | 330 | 1.198 | no |
| 2 | 13.5 | 1.5 | 0.25 | 0.75 | 400 | Standard pressure | 330 | 1.198 | no |
| 3 | 13.5 | 1.5 | 0.25 | 0.75 | 100 | Standard pressure | 350 | 1.197 | no |
| 4 | 13.5 | 1.5 | 0.25 | 0.75 | 400 | Standard pressure | 350 | 1.197 | no |
| 5 | 13.5 | 1.5 | 0.25 | 0.75 | 100 | 6-8 mbar | 330 | 1.199 | no |
| 6 | 13.5 | 1.5 | 0.25 | 0.75 | 400 | 15 | 330 | 1.200 | no |
| 7 | 13.5 | 1.5 | 0.25 | 0.75 | 100 | 3 | 350 | 1.199 | no |
| 8 | 13.5 | 1.5 | 0.25 | 0.75 | 400 | 3 | 350 | 1.199 | no |

[1] In Examples 1-8 siloxane 1 was used.

Comparative Examples 1-8 show condensation to give a higher molecular weight material is achievable neither under standard pressure nor under fine vacuum. The solution viscosity remains unchanged compared to the starting material within the accuracy of measurement. The variation of the speed and hence of the shear energy introduced, and of the housing temperature, does not result in a change in the viscosity either. Light microscopy analysis shows that the silicone component is merely physically incorporated in the extruded material. This was surprising, since the incorporation of the silicone component was possible in U.S. Pat. Nos. 5,414,054 and 5,821,321. However, the silicone component introduced here, in combination with the catalyst, is probably unsuitable for preparation of a copolymer.

TABLE 2

Inventive Examples (use of a reactor combination of a twin-screw extruder and a high-viscosity reactor)

| Ex. | PC kg/h | Cat. MB kg/h | Cat. % | Siloxane[2] kg/h | Speed rpm | Vacuum | Housing temperature °C | Viscosity. | Incorporation (light microscopy) |
|---|---|---|---|---|---|---|---|---|---|
| 9[1] | 13.5 | 1.5 | 0.25 | 0.75 | 200 | 200 mbar (TSE Z2) 0.9 mbar (HVR) | 350 (TSE) 350 (HVR) | 1.294 | yes |
| 10 | 13.5 | 1.5 | 0.25 | 0.75 | 400 | 120 mbar (TSE Z2) 0.5 mbar (HVR) | 350 (TSE) 350 (HVR) | 1.282 | yes |
| 11 | 13.5 | 1.5 | 0.25 | 0.75 | 300 | 200 mbar (TSE Z2) 0.8 mbar (HVR) | 350 (TSE) 350 (HVR) | 1.337 | yes |

[1] Concentraion of the rearrangement structures contained in the cocondensate: (Ia) 65 ppm, (IIa) 51 ppm, (IIIa) 14 ppm and (IVa) 23 ppm, based on teh cocondensate and determined after hydrolysis.
[2] In example 9, siloxane 2 was used. In example 10, siloxane 3 was used and in example 11, siloxane 4 was employed.

Inventive Examples 9-11 show that a high molecular weight product can be achieved in the inventive machine configuration. The solution viscosities of the products which have been obtained via a reactive extrusion are within the range from high-viscosity injection moulding or extrusion types.

It was shown by light microscopy images that a homogeneous distribution of the silicone domains is present.

The shear viscosities of the block cocondensate obtained by the process according to the invention and of conventional commercially available siloxane-containing block cocondensates and conventional linear polycarbonates based on bisphenol A are shown in Table 3.

TABLE 3

Shear viscosities at various shear rates at 300° C. (high-pressure capillary rheometer)

| Shear rate [s⁻¹] | Makrolon ® 2808 (Comparative example) viscosity [Pas] | Lexan ® EXL1414T (Comparative example) viscosity [Pas] | Lexan ® EXL9330 (Comparative example) viscosity [Pas] | Example 9 (Inventive example) viscosity [Pas] | Example 10 (Inventive example) viscosity [Pas] |
|---|---|---|---|---|---|
| 50 | 570* | 525 | 484 | 547 | 451 |
| 100 | 554 | 479 | 437 | 484 | 407 |
| 200 | 532 | 417 | 387 | 397 | 336 |
| 500 | 456 | 332 | 315 | 270 | 232 |
| 1000 | 363 | 258 | 243 | 201 | 165 |
| 1500 | 302 | 216 | 202 | 169 | 138 |

*value at 50 s⁻¹ extrapolated

It is apparent from Table 3 that the viscosity decreases significantly at relatively high shear rates in the inventive examples. For example, in the case of linear polycarbonate (Makrolon® 2808), the viscosity, with comparable zero viscosity is higher under high shear rates than in the case of the inventive examples. Surprisingly, the flowability, with similar or even higher starting viscosity, for the inventive materials is thus higher under shear compared to conventional, commercially available siloxane block copolycarbonates obtained in the interfacial process. This was surprising and unforeseeable.

TABLE 4

Melt stability (MVR 300° C. after residence times)

| Residence time [min] | Makrolon 2808 (Comparative example) MVR | Lexan EXL1414T (Comparative example) MVR | Lexan EXL9330 (Comparative example) MVR | Example 9 (Inventive example) MVR | Example 10 (Inventive example) MVR |
|---|---|---|---|---|---|
| 4 | 9.76 | 7.28 | 8.75 | 8.11 | 10.39 |
| 20 | 9.77 | 7.04 | 10.61 | 8.10 | 10.37 |
| 30 | 9.84 | 8.35 | 11.0 | 7.90 | 10.29 |
| Δ (4/30 min) | 0.08 | 1.07 | 2.25 | 0.21 | 0.1 |

Surprisingly, the inventive samples (Examples 9 and 10), in spite of production in a reactive extrusion process, exhibit a high melt stability. The melt stability is surprisingly even higher than in the case of siloxane-containing polycarbonates which have been obtained in the interfacial process.

Mechanical Behavior at Different Wall Thickness:

For the mechanical trials test bars with a wedge-shaped geometry were prepared by injection molding.

V-notches were applied on the wedge shaped samples at different positions (different thicknesses). The samples had V-shaped notches with a notch radius of 0.10 mm and 0.25 mm at different thicknesses.

A three point bending test was performed at each sample at room temperature.

Figure 2:
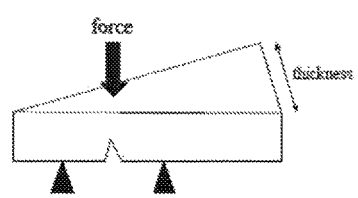
FIG. 2 shows the wedge-shaped test bars used in the mechanical trials.

The trials were performed on an Instron 5566 testing machine with a strain rate of 10 mm/min with 42 mm distance between the support edges (see FIG. 2).

TABLE 5

| | Makrolon 2808 (Comparative example) | Example 9 (inventive example) |
|---|---|---|
| Critical thickness (0.10 mm) | 5.65 ± 0.05 mm | >7.0 mm |
| Critical thickness (0.25 mm) | 6.75 ± 0.25 mm | >7.0 mm |

It could be shown that the critical thickness is higher for the material according to the invention when compared to a standard polycarbonate material. The standard polycarbonate sample shows a critical thickness of 5.65 mm for a notch radius of 0.1 mm whereas the inventive material is still ductile at this thickness (critical thickness higher than 7.0 mm).

Effect of the Addition of Sodium Acetate:

The reactive extrusion was carried out similar to the examples described above. Deviating from the examples above, a siloxane with a sodium content of 1.3 ppm in the form of sodium acetate was used. The extrusion data set is shown below.

TABLE 6

| Ex. | PC kg/h | Cat. MB kg/h | Cat. % | Siloxane kg/h | Speed rpm | Vacuum | Housing temperature ° C. | Visc. eta rel. |
|---|---|---|---|---|---|---|---|---|
| 12 | 27 | 3 | 0.25 | 1.5 | 600 | 350 mbar (ZSK Z2) 1.1 mbar (HVR) | 350 (ZSK) 350 (HVR) | 1.288 |

The reactive extrusion was carried out similar to the examples described above. Deviating from the examples above, a siloxane with a sodium content of 2.5 ppm in the form of sodium benzoate was used. The extrusion data set is shown below.

TABLE 7

| Ex. | PC kg/h | Cat. MB kg/h | Cat. % | Siloxane kg/h | Speed rpm | Vacuum | Housing temperature ° C. | Visc. eta rel. |
|---|---|---|---|---|---|---|---|---|
| 13 | 45 | 5 | 0.25 | 2.5 | 680 | 180 mbar (ZSK Z2) 1.0 mbar (HVR) | 350 (ZSK) 350 (HVR) | not determined |

Thus, it could be shown that by using special co-catalysts the throughput on the reactor could be enhanced considerably.

It becomes evident from table 8 that despite the use of alkaline substances and although no quencher or stabilizer was used, the resulting block cocondensate shows high melt stability.

TABLE 8

MVR according to ISO 1133 after different residence times (300° C; 1.2 kg)

|  | Example 12 | Example 13 |
|---|---|---|
| MVR 5 min | 8.3 | 9.0 |
| 20 min | 8.4 | 9.1 |
| 30 min | 8.3 | 9.2 |

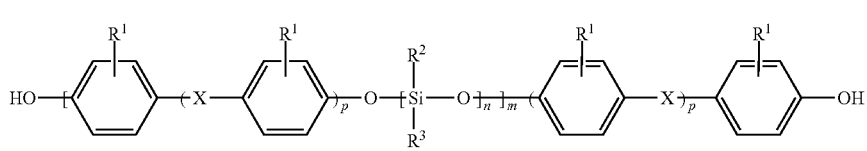

The invention claimed is:

1. A process for preparing polysiloxane-polycarbonate block cocondensates, comprising reacting at least one hydroxyaryl-terminated polydialkylsiloxane with at least one polycarbonate in the melt, wherein the process is conducted in at least two stages in a reactor combination consisting of at least one preliminary reactor and a high-viscosity reactor and a discharge unit, wherein the material temperature in the high-viscosity reactor is within the range of from 330° C. to 370° C. and the pressure is within the range of from 0.03 to 5 mbar.

2. The process according to claim 1, wherein the preliminary reactor consists of a single- or twin-screw extruder.

3. The process according to claim 1, wherein the high-viscosity reactor has two or more shafts which rotate in parallel, on which there are axially offset, circular discs with strippers distributed on the circumference thereof.

4. The process according to claim 1, wherein the discharge unit used is a single-screw screw, twin-screw screw or a gear pump.

5. The process according to claim 1, wherein the material temperature in the preliminary reactor is within the range of from 300° C. to 380° C. and the pressure in the preliminary reactor is at least temporarily within the range of from 200 to 0.1 mbar.

6. The process according to claim 1, wherein the residence time in the high-viscosity reactor is less than 50 minutes.

7. The process according to claim 1, wherein the polycarbonate has a weight-average molecular weight of 16 000 to 28 000 g/mol and an OH end group content of 300 to 900 ppm.

8. The process according to claim 1, wherein the hydroxyaryl-terminated polydialkylsiloxane has the structure (1)

in which $R^1$ is H, Cl, Br or $C_1$ to $C_4$-alkyl, $R^2$ and $R^3$ are the same or different and each independently from one another selected from aryl, $C_1$ to $C_{10}$-alkyl and $C_1$ to $C_{10}$-alkylaryl, X is a single bond, —CO—, —O—, $C_1$ to $C_6$-alkylene, $C_2$ to $C_5$-alkylidene, $C_5$ to $C_{12}$-cycloalkylidene or $C_6$ to $C_{12}$-arylene which may optionally be fused to further aromatic rings containing heteroatoms, n is a number from 1 to 500, m is a number from 1 to 10, and p is 0 or 1.

9. The process according to claim 8, wherein n is a number from 10 to 100 and m is a number from 2 to 5.

10. The process according to claim 1, wherein the hydroxyaryl-terminated polydialkylsiloxane has a weight-average molecular weight of 3000-20 000 g/mol.

11. The process according to claim 1, wherein a phosphonium catalyst of the formula of the formula (5) is used during the reaction:

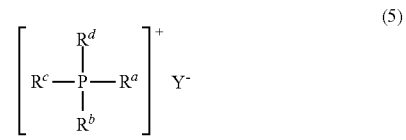

where $R^a$, $R^b$, $R^c$ and $R^d$ may be identical or different $C_1$-$C_{10}$-alkyls, $C_6$-$C_{14}$-aryls, $C_7$-$C_{15}$-arylalkyls or $C_5$-$C_6$-cycloalkyls, and Y- may be an anion selected from the group consisting of hydroxide, sulphate, hydrogensulphate, hydrogencarbonate, carbonate, halide or an alkoxide or aroxide of the formula -$OR^e$ where $R^e$ is $C_6$-$C_{14}$-aryl, $C_7$-$C_{15}$-arylalkyl or $C_5$-$C_6$-cycloalkyl.

12. The process according to claim 1, wherein the catalyst used is tetraphenylphosphonium phenoxide.

13. The process according to claim 1, wherein the hydroxyaryl-terminated polydialkylsiloxane is used in an amount of 2 to 20%, based on the polycarbonate used.

14. The process according to claim 1, wherein the siloxane and the polycarbonate are reacted in the presence of at least one organic or inorganic salt of an acid having a $pK_A$ value within the range of from 3 to 7 (25 ° C.).

* * * * *